United States Patent Office 2,965,609
Patented Dec. 20, 1960

---

2,965,609

PROCESS FOR CURING POLYEPOXIDES AND RESULTING PRODUCTS

Herbert A. Newey, Lafayette, Calif., assignor to Shell Oil Company, a corporation of Delaware No Drawing. Filed June 30, 1958, Ser. No. 745,259

7 Claims. (Cl. 260—47)

---

This invention relates to a process for curing polyepoxides. More particularly, the invention relates to a new process for curing polyepoxides with a special class of amino curing agents, and to the useful products obtained therefrom.

Specifically, the invention provides a new process for curing and resinifying polyepoxides, preferably glycidyl polyethers of polyhydric phenols or polyhydric alcohols, which comprises mixing and reacting the polyepoxide with a N-(aminoalkyl)-piperazine, such as, for example, N-(aminoethyl)piperazine. The invention further provides hard resinous products obtained by the above described process.

Polyepoxides, such as those obtained by reacting epichlorohydrin with polyhydric phenols in the presence of caustic, have been cured with various basic substances including some amines to form insoluble, infusible products. The products obtained with these curing agents, however, have not been too satisfactory. Many of the products, for example, have relatively low impact strength. Attempts to improve the impact strength have always resulted in a loss in heat resistance. In addition, the cured products also fail to have the elongation, tensile and tear strengths required for many applications. Further, the products in many cases fail to have the desired degree of resistance to powerful organic solvents, such as aliphatic ketones.

It is an object of the invention, therefore, to provide a new process for curing polyepoxides. It is a further object to provide a process for curing polyepoxides which give cured polyepoxides which gives a product having high impact strength. It is a further object to provide a process which gives cured products having high impact strength as well as good heat resistance. It is a further object to provide a process for curing polyepoxides which gives a product having improved elongation and tensile and tear strengths. It is a further object to provide a process for curing polyepoxides which gives products having improved resistance to solvents. Other objects and advantages of the invention will be apparent from the following detailed description thereof.

It has now been discovered that these and other objects may be accomplished by the process of the invention which comprises mixing and reacting the polyepoxide with a N-(aminoalkyl)piperazine. It has been found that these particular amines possess unexpected properties as curing agents as they cause a rapid cure of the polyepoxides and form insoluble, infusible products which have excellent impact strength. Surprisingly, this improvement in impact strength is obtained without sacrifice of heat resistance. In addition, the cured products have unexpected improvement in elongation, tensile and tear strengths as well as resistance to solvents.

Further advantage is found in the fact that the use of these special curing agents improves the compatibility of the polyepoxides with other resins and flexibilizers so that more of the cheaper materials, such as pine oil, may be incorporated into the finished product without materially affecting the desired physical properties.

The N-(aminoalkyl)piperazine used as curing agents in a process of the invention are the piperazines, substituted or unsubstituted, that have an amino-substituted alkyl group attached to one of the ring nitrogen atoms. Preferred members are those of the formula

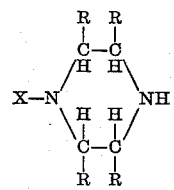

wherein R is hydrogen or an alkyl radical or alkoxy radical and X is an amino-substituted alkyl radical. Examples of these compounds include, among others, N-aminobutylpiperazine, N-aminoisopropyl-3-butoxy-piperazine, N-aminoisopropylpiperazine, N-aminohexylpiperazine, 2,5-dibutyl-N-aminoethylpiperazine, and 2,5-dioctyl-N-aminobutylpiperazine and the like. Particularly preferred curing agents include the N-(aminoalkyl)piperazines wherein the alkyl group contains no more than six carbon atoms.

According to the process of the invention, the N-(aminoalkyl)piperazine is mixed and reacted with the polyepoxide and the resulting mixture is allowed to set to the desired hard resinous product. Although reaction of the mixture occurs slowly at temperatures as low as 20° C., conversion to a hard, tough solvent-resistant product is preferably effected at about 50° C. to 280° C. with excellent results being continued from about 90° C. to 200° C.

Although it is desirable to mix the N-(aminoalkyl)-piperazine with the polyepoxide in such proportions that there is present about 0.25 mol of the N-(aminoalkyl)-piperazine per epoxide equivalent weight of the polyepoxide, the proportion may be varied widely. Thus, in general, there is used about 0.15 to 0.75 mol of the N-(aminoalkyl)piperazine per epoxy equivalent weight of the polyepoxide weight. Preferably, the substituted piperazine and the polyepoxide are mixed so that there is from 0.2 to 0.4 mol of the substituted piperazine per epoxide equivalent weight of the polyepoxide.

In executing the process of the invention, it is desirable to have the polyepoxide in a mobile liquid condition when the polyamino-substituted pyridine curing agent is added in order to facilitate mixing. The polyepoxides are generally viscous to solid materials at ordinary temperature. With those that are liquid, but too viscous for readily mixing, they are either heated to reduce the viscosity or have a liquid solvent added thereto in order to provide fluidity. Normally solid members are likewise either melted or mixed with a liquid solvent. Various solvents are suitable for achieving fluidity of the polyepoxides. These may be volatile solvents which escape from the polyether compositions containing the diamine by evaporation before or during the curing such as ketones like acetone, methyl ethyl ketone, methyl isobutyl ketone, isophorone, etc., esters such as ethyl acetate, butyl acetate. Cellosolve acetate (ethylene glycol monoacetate), methyl Cellosolve acetate (acetate of ethylene glycol monomethyl ether), etc.; ether alcohols such as methyl, ethyl or butyl ether of ethylene glycol or diethylene glycol; chlorinated hydrocarbons such as trichloropropane, chloroform, etc. To save expense, these active solvents may be used in admixture with aromatic hydrocarbons such as benzene, toluene, xylene, etc., and/or alcohols such as ethyl, isopropyl or n-butyl alcohol. Solvents which remain in the cured compositions may also be used, such as diethylphthalate, or liquid monoepoxy compounds including glycidyl allyl ether, glycidyl phenyl ether, styrene oxide, and the like, as well as cyano-substituted hydrocarbons, such as acetonitrile. It is also convenient to employ a glycidyl polyether of the dihydric phenol in admixture with a normally liquid glycidyl polyether of a polyhydric alcohol.

The N-(aminoalkyl)piperazines may also be used in combination with other curing agents, such as aliphatic polyamines, polycarboxylic acids and anhydrides, BF₃ and its complexes, e.g., amine complexes and polythiols.

One important application of the invention is the production of laminates or resinous articles reinforced with fibrous textiles. Although it is generally preferred to utilize glass cloth for this purpose, any of the other suitable fibrous materials in sheet form may be employed such as glass matting, paper, asbestos paper, mica flakes, cotton bats, duck muslin, canvas and the like.

In preparing the laminate, the sheets of fibrous material are first impregnated with the mixture of glycidyl polyether and N-(aminoalkyl)piperazine. This is accomplished by dissolving the amine in acetone and mixing the solution with the polyether so as to obtain a fluid mixture. The sheets of fibrous material are impregnated with the mixture by spreading it thereon or by dipping or otherwise immersing them in the impregnant. The solvent is conveniently removed by evaporation and the mixture is cured to the fusible resin stage. Although this operation may be conducted at room temperature (20 to 25° C.), it is preferred to use somewhat elevated temperature such as about 50° C. to 200° C. with the impregnated sheet stock passing through or hanging free in an oven or other suitable equipment. The resinification is arrested before infusible product occurs by cooling below about 40° C., preferably to about 20 to 25° C. A plurality of the impregnated sheets are then superposed and the assembly is cured in a heated press under a pressure of about 25 to 500 or more pounds per square inch. The resulting laminate is extremely strong and resistant against the action of organic and corrosive solvents.

Another important use of the invention is the production of molded articles. A molding powder is first prepared by mixing together a mixture of a glycidyl polyether and N-(aminoalkyl)piperazine along with customary fillers and mold release agents. Usually the milled mixture is set up so that the fusible resin is contained therein. The milled mixture is then ground and molded articles are prepared therefrom with conversion of the fusible resin into the infusible state with use of molding machines such as those for compression molding or transfer molding. If desired, the fusible milled mixture may be prepared in pre-form pellets and the like.

Still another important use of the invention is in the preparation of coating and surfacing compositions. In this application, the polyepoxide, special curing agent and other desired resinous materials, plasticizers, flexibilizers are combined together and the mixture applied to the desired surface, such as concrete, asphalt, steel, wood, plaster, stone and the like, and then allowed to set.

As noted above, one of the special advantages of the new curing agents is that they permit the use of much larger amounts of fillers, extenders and plasticizers or flexibilizers without forming incompatible compositions. Polyepoxide compositions, for example, can usually tolerate relatively small amount of other materials as pine oil, etc. The new curing agents now enable one to utilize from 1.5 to 3 times that previously used.

The polyepoxides to be used in the process of the invention include those organic compounds containing a plurality of epoxy groups, i.e., $$-\overset{O}{\underset{}{C}-\underset{}{C}}-$$

groups. These compounds may be saturated or unsaturated, aliphatic, cycloaliphatic, aromatic or heterocyclic and may be substituted if desired with substituents, such as chlorine atoms, hydroxyl groups, ether radicals, and the like. They may also be monomeric or polymeric.

For clarity, many of the polyepoxides and particularly those of the polymeric type in terms of epoxy equivalent value. The meaning of this expression is described in U.S. 2,633,458.

If the polyepoxide material consists of a singly compound and all of the epoxy groups are intact, the epoxy equivalency will be integers, such as 2, 3, 4 and the like. However, in the case of the polymeric type polyepoxides many of the materials may contain some of the monomeric monoepoxides and/or contain macromolecules of somewhat different molecular weight so the epoxy equivalent values may be quite low and contain fractional values. The polymeric material may, for example, have epoxy equivalent values, such as 1.5, 1.8, 2.5, and the like.

Various examples of polyepoxides that may be used in the process of the invention are given in U.S. 2,633,458 and it is to be understood that so much of the disclosure of that patent relative to examples of polyepoxides is incorporated by reference into this specification.

A group of polyepoxides which are not specifically illustrated in the above patent but are of particular value in the process of the invention are the glycidyl ethers of novolac resins which resins are obtained by condensing an aldehyde with a polyhydric phenol. A typical member of this class is the epoxy resin from formaldehyde 2,2-bis(5-hydroxyphenyl)propane novolac resin which contains as predominant constituent the substance represented by the formula

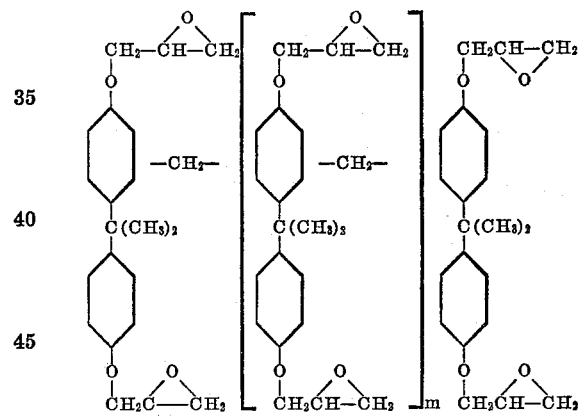

Another group of preferred polyepoxides comprise the glycidyl ethers of alpha,alpha,omega,omega-tetrakis(hydroxyaryl)alkanes as described and claimed in Schwarzer, Serial No. 466,208, filed November 1, 1954.

To illustrate the manner in which the invention may be carried out, the following examples are given. It is to be understood, however, that the examples are for the purpose of illustration and the invention is not to be regarded as limited to any of the specific materials or conditions recited therein. Polyethers A, B and C referred to herein are those described in U.S. 2,633,458.

*Example I*

This example illustrates the use of N-(aminoethyl)piperazine as a curing agent for polyether A.

300 parts of polyether A and 66 parts of N-(aminoethyl)piperazine are mixed together and the mixture heated at 120° C. for 1 hour and then 125° C. for 4 hours. The resulting casting had a heat distortion point of 120° C. and an Izod impact of 1.8 ft. lbs./in. The casting also had excellent elongation, tensile strength and tear strength and good resistance to acetone.

In a related experiment where 300 parts of the polyether A was heated with an equivalent amount of diethylene triamine, the resulting cured product had an impact strength of only 0.59 and a heat distortion of 105° C. Thus, with the above special curing agent, one obtains superior improvement in impact without a significant change in heat resistance.

In a related experience, equivalent amount of unsubstituted piperazine was used in place of the N-(aminoethyl)piperazine in the above process under the same conditions. No cure of the polyether was obtained.

*Example II*

This example illustrates the use of N-(aminoethyl)-piperazine as a curing agent for a mixture of polyether A and diglycidyl ester of a tall oil-maleic acid adduct.

200 parts of polyether A, 100 parts of diglycidyl ester of tall oil-maleic acid, and 57 parts of N-(aminoethyl)-piperazine were mixed together and the mixture heated for 1 hour at 100° C. and then 4 hours at 125° C. The resulting casting had an Izod impact of 1.77 ft. lbs./in., a flex strength of $14.5 \times 10^{-3}$ and good heat resistance. Casting also had good elongation, good tensile strength and tear strength and excellent resistance to water and acetone.

*Example III*

90 parts of polyether A, 10 parts of diglycidyl ester of tall oil-maleic acid, and 20 parts of N-(aminoethyl)piperazine were mixed together and the mixture heated for 1 hour at 100° C. and then for 4 hours at 175° C. The resulting casting had an Izod impact of 1.8 ft. lbs./in., a flex strength of $14.6 \times 10^{-3}$ p.s.i. and good heat resistance.

*Example IV*

This example illustrates the use of N-(aminoethyl)-piperazine curing agent of polyallyl glycidyl ether.

100 parts of polyallyl glycidyl ether were mixed with 20 parts of N-(aminoethyl)piperazine and the mixture heated at 100° C. for several hours. The resulting casting had excellent impact strength to solvents and had good hardness and impact strength.

*Example V*

This example illustrates the use of N-(aminoethyl)-piperazine as a curing agent for polyether D.

100 parts of polyether D and 20 parts of N-(aminoethyl)piperazine are mixed with xylene and Cellosolve acetate (50:50). This mixture was then spread on steel panels and baked for 30 minutes at 150° C. The resulting films were hard and had good impact strength and good heat resistance and good resistance to acetone.

*Example VI*

This example illustrates the use of N-(aminobutyl)-piperazine as a curing agent for polyether B.

100 parts of polyether B and 22 parts of N-(aminobutyl)piperazine are mixed together and the mixture heated at 100° C. for several hours and then at 125° C. for 2 hours. The resulting casting was very hard, had excellent impact strength and good resistance to acetone.

*Example VII*

This example illustrates the use of the mixture of N-(aminoethyl)piperazine and diethylaminopropylamine in a preparation of an adhesive from polyether A.

100 parts of polyether A, 30 parts of polyvinyl butyral, 20 parts of asbestos, 10 parts of N-(aminoethyl)piperazine, and 10 parts of N-(aminoethyl)piperazine, and 10 parts of diethylaminopropylamine were mixed together and applied as an adhesive between two aluminum sheets. The adhesive board was then cured at 150° C. for several hours. The resulting board was very strong and had good peel strength and high temperature strength.

*Example VIII*

This example illustrates the use of N-(aminoethyl)-piperazine as a curing agent for a mixture of polyether A and diglycidyl ester of dimerized linoleic acid.

14.6 parts of N-(aminoethyl)piperazine were combined with a mixture of 33 parts of polyether A and 66 parts of diglycidyl ester of dimerized linoleic acid. The mixture was heated at 125° C. for 4 hours. The resulting product was a tough plastic having an excellent high Izod impact strength of 2.56 ft. lbs./in.

*Example IX*

100 parts of polyether A were combined with 130 parts of pine oil and 22 parts of N-(aminoethyl)piperazine and the mixture heated at 125° C. to form a hard homogeneous casting having good strength and resistance to solvents.

In a similar set of experiments, the N-(aminoethyl)-piperazine was replaced with diethylene triamine. In this case, the composition could only tolerate about 70 parts of the pine oil before the composition became heterogeneous and had poor strength.

*Example X*

Example I is repeated with the exception that polyether A is replaced with an addition polymer of glycidyl methacrylate having a molecular weight of about 2,000. Related results are obtained.

*Example XI*

Example I is repeated with the exception that polyether A is replaced with a mixture of 50 parts polyether A and 50 parts of epoxidized soybean oil. Related results are obtained.

*Example XII*

Example I is repeated with the exception that polyether A is replaced with N,N-diglycidyl aniline. The resulting product is a hard solvent resistant product having good impact strength.

*Example XIII*

Examples I to X are repeated with the exception that the N-(aminoalkyl)piperazine curing agent is as follows: N-(aminohexyl)piperazine, N-(aminoethyl)-2,5-diethyl-piperazine and N-(aminobutyl)-5-methoxypiperazine.

I claim as my invention:

1. A process for producing a resinified product which comprises mixing and reacting at a temperature between 20° C. and 280° C. a polyepoxide having a

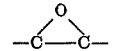

group equivalency greater than 1.0 with an N-aminoalkyl)piperazine having the structure

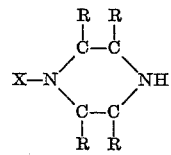

wherein R is a member of the group consisting of hydrogen, alkyl and alkoxy radicals and X is an aminoalkyl radical containing no more than six carbon atoms in an amount of about 0.15 to 0.7 mol of the piperazine per epoxide equivalent weight of the polyepoxide.

2. The resinous product obtained by the process of claim 1.

3. A process for producing a resinified product which comprises mixing and reacting at a temperature between 20° C. and 280° C. a polyepoxide having a

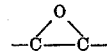

group equivalency greater than 1.0 with N-(aminoethyl)-piperazine.

4. A process for producing a resinified product which comprises mixing and reacting a glycidyl polyether of a polyhydric phenol having a 1,2 epoxy equivalency between 1.0 and 2.0 with an N-(aminoalkyl)piperazine having the structure

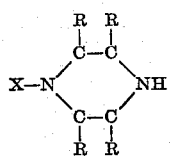

wherein R is a member of the group consisting of hydrogen, alkyl and alkoxy radicals and X is an aminoalkyl radical containing no more than six carbon atoms in an amount of about 0.15 to 0.7 mol of the piperazine per epoxide equivalent weight of the polyepoxide and heating the mixture to a temperature of between 50° C. and 200° C. to form a hard cured product.

5. A process for producing a resinified product which comprises mixing and reacting a glycidyl polyether of a polyhydric phenol having a 1,2-epoxy equivalency between 1.0 and 2.0 with N-(aminoethyl)piperazine in an amount of about 0.15 to 0.7 mol of the N-(aminoethyl)-piperazine per epoxide equivalent weight of the polyepoxide and heating the mixture to a temperature of between 50° C. and 200° C. to form a hard cured product.

6. A process as in claim 4 wherein curing agent is N-(aminoethyl)piperazine.

7. A process for producing a resinified product which comprises commingling an N-(aminoalkyl)piperazine having the structure

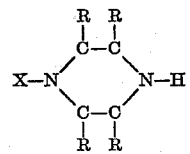

wherein R is a member of the group consisting of hydrogen, alkyl and alkoxy radicals and X is an aminoalkyl radical containing no more than six carbon atoms with a glycidyl polyether of 2,2-bis(4-hydroxyphenyl)propane in an amount of about 0.2 to 0.5 mol of the substituted piperazine per epoxide equivalent weight of the glycidyl polyether and heating the mixture at a temperature between 90° C. and 175° C. to form a hard cured product.

References Cited in the file of this patent

UNITED STATES PATENTS

| | | |
|---|---|---|
| 2,642,412 | Newey et al. | June 16, 1953 |
| 2,794,804 | Kushner et al. | June 4, 1957 |
| 2,826,556 | Greenspan et al. | Mar. 11, 1958 |
| 2,844,580 | Ashby et al. | July 22, 1958 |